United States Patent
Ayoob et al.

(10) Patent No.: US 9,329,262 B2
(45) Date of Patent: May 3, 2016

(54) SITUATIONAL AWARENESS PERSONAL SERVICE

(71) Applicant: Raytheon Company, Waltham, MA (US)

(72) Inventors: Mitchell P. Ayoob, Acton, MA (US); Mark R. Desmarais, East Sandwich, MA (US); Anthony M. Ponsford, Ottawa (CA); Joseph Nimmich, Dunkirk, MD (US); Robert W. Bowne, Papillion, NE (US)

(73) Assignee: Raytheon Company, Waltham, MA (US)

( * ) Notice: Subject to any disclaimer, the term of this patent is extended or adjusted under 35 U.S.C. 154(b) by 224 days.

(21) Appl. No.: 14/063,625

(22) Filed: Oct. 25, 2013

(65) Prior Publication Data

US 2015/0119081 A1   Apr. 30, 2015

(51) Int. Cl.
  *G01S 13/87*   (2006.01)
  *H04W 4/02*   (2009.01)
  *H04W 64/00*   (2009.01)
  *G01C 21/20*   (2006.01)
  (Continued)

(52) U.S. Cl.
  CPC ............ *G01S 13/87* (2013.01); *G01C 21/20* (2013.01); *G06Q 30/00* (2013.01); *H04L 67/18* (2013.01); *H04W 4/02* (2013.01); *H04W 64/00* (2013.01); *G01C 23/00* (2013.01); *G01S 13/06* (2013.01)

(58) Field of Classification Search
  CPC ....... H04W 4/02; H04W 4/023; H04W 4/027; H04W 4/028; H04W 4/04; H04W 4/046; H04W 64/00; H04W 64/006

USPC ............ 701/300–302, 400, 409, 411, 413, 701/415–419, 422, 423, 528; 455/414.3, 455/456.3, 461
  See application file for complete search history.

(56) References Cited

U.S. PATENT DOCUMENTS 7,084,052 B2   8/2006 Hirano et al.
7,515,087 B1 *  4/2009 Woodell et al. ............. 342/26 B
(Continued)

FOREIGN PATENT DOCUMENTS

EP   2 189 935 A1   5/2010
WO   WO 2013/059916   5/2013

OTHER PUBLICATIONS

PCT Notification of Transmittal of ISR and Written Opinion dated Apr. 10, 2015 corresponding to Patent Application No. PCT/US2014/059435; 1 Page.

(Continued)

*Primary Examiner* — Thomas Tarcza
*Assistant Examiner* — Tyler J Lee
(74) *Attorney, Agent, or Firm* — Daly, Crowley, Mofford & Durkee, LLP

(57) ABSTRACT

A situational awareness personal service (SAPS) receives data records from a wide variety of data sources and provides real-time, tailored, situational awareness (SA) information to subscribers. The SA information, which can include course of action recommendations and threat assessments, can be made available and affordable to the general public. Subscribers may view the SA information using commercial off the shelf (COTS) devices, such as laptop computers, smartphones, and existing onboard integrated displays. In one aspect, transportation platforms can provide local observation data, such as radar tracking data, to the SA personal service in exchange for tailored SA information.

17 Claims, 4 Drawing Sheets

(51) Int. Cl.
 G06Q 30/00 (2012.01)
 H04L 29/08 (2006.01)
 *G01C 23/00* (2006.01)
 *G01S 13/06* (2006.01)

(56) References Cited

U.S. PATENT DOCUMENTS

| | | | |
|---|---|---|---|
| 7,542,852 B1 * | 6/2009 | Rose et al. | 702/3 |
| 8,159,369 B1 * | 4/2012 | Koenigs et al. | 340/963 |
| 2008/0033224 A1 | 2/2008 | Commereuc et al. | |
| 2008/0183485 A1 | 7/2008 | Drabble et al. | |
| 2010/0042275 A1 * | 2/2010 | Kirk | 701/14 |
| 2010/0188265 A1 * | 7/2010 | Hill et al. | 340/905 |
| 2010/0328143 A1 * | 12/2010 | Kirk | 342/26 B |
| 2010/0332056 A1 * | 12/2010 | Kirk | 701/14 |
| 2012/0139778 A1 * | 6/2012 | Bunch et al. | 342/26 B |
| 2012/0215735 A1 | 8/2012 | Abielmona et al. | |
| 2012/0271538 A1 * | 10/2012 | Lee et al. | 701/117 |
| 2012/0326889 A1 * | 12/2012 | Kabler et al. | 340/905 |
| 2013/0009760 A1 * | 1/2013 | Washlow et al. | 340/425.5 |
| 2013/0214939 A1 * | 8/2013 | Washlow et al. | 340/901 |
| 2014/0024395 A1 * | 1/2014 | Johnson et al. | 455/456.3 |

OTHER PUBLICATIONS

PCT International Search Report dated Apr. 10, 2015 corresponding to Patent Application No. PCT/US2014/059435; 3 Pages.

PCT Written Opinion of the ISA dated Apr. 10, 2015 corresponding to Patent Application No. PCT/US2014/059435; 5 Pages.

* cited by examiner

SITUATIONAL AWARENESS PERSONAL SERVICE

BACKGROUND

Governments, businesses, and individuals have a need for real-time situational awareness (SA) information for air, land, and water transportation purposes. For example, ship captains navigating arctic passages need real-time SA information to avoid moving icebergs, bad weather conditions, and other hazards. Likewise, planes, trains, trucks, and other transportation platforms can benefit from SA information.

Traditionally, SA is provided for defined geographic regions through a limited access and expensive network of communications, sensors, and command and control. SA information is extracted from a number of different data sources using a variety of communication devices and processed onboard a platform. Information is generally provided on a geographic basis with data sources differing between geographic regions. For example, a maritime vessel typically uses data from its onboard radar, "Aid-to-Navigation" radio reports, weather and environmental reports, etc. This data is not tailored to a specific vessel, may cover a broad geographic area, and, therefore, must be correlated, filtered, and interpolated by local platform staff to obtain relevant SA. Thus, SA is currently a skilled process, time consuming, and prone to error.

Moreover, current SA solutions cannot utilize a wide variety of data sources and cannot be readily adapted to consider new forms of data. For example, a vessel's SA does not currently take advantage of radar or other sensors from other cooperating vessels that could identify threats outside that vessel's detecting range, including intentional threats such as piracy, and environment threats such as ice formations. Further, such data could be used to monitor illegal activities, including drug smuggling, unlawful personal conveyance, and illegal fishing.

In addition, current SA solutions require specialized equipment and/or personnel and thus, are cost prohibitive for many users. Accordingly, improved SA systems and methods are needed.

SUMMARY

Presently described is a system comprising: a data ingestion module to receive data records from two or more data sources; a data analytics module, coupled to the data ingestion module, to correlate the data records to identify a plurality of navigation hazards, identify navigation hazards of interest based upon a geographic region of interest, and generate SA information based upon the geographic region of interest and the navigation hazards of interest; and a situational awareness personal service (SAPS) module coupled to the data analytics module, comprising a processor, to receive a situational awareness (SA) information request from a subscriber, determine the geographic region of interest, the geographic region of interest associated with the SA information request, and send the SA information to the subscriber.

Also presently described is a method comprising the steps: receiving data records from two or more data sources; correlating the data records to identify a plurality of navigation hazards; receiving a situational awareness (SA) information request from a subscriber; determining a geographic region of interest associated with the SA information request; identifying navigation hazards of interest based upon the geographic region of interest; generating SA information based upon the geographic region of interest and the navigation hazards of interest; and sending the SA information to the subscriber, wherein the method is implemented in a computer system comprising one or more processors configured to execute one or more computer programs.

In accordance with one aspect of the system and method, at least one of the two or more data sources comprises radar data from radar onboard a transportation platform and/or Automatic Identification System (AIS) broadcast data. In one aspect, at least one of the navigation hazards is identified by a position, a heading, and a speed. In certain embodiments, the SA information includes an enhanced situation display of the geographic region of interest and/or a course of action. According to one aspect, the subscriber is associated with a transportation platform and the geographic region of interest is based upon the transportation platform's last known position, speed, and heading. In accordance with another aspect, at least one of the data records has a first data format, the data ingestion module further provided to convert the at least one of the data records from the first data format to a second data format.

According to one aspect of the method, the navigation hazards are initial navigation hazards, the navigation hazards of interest are initial navigation hazards of interest, and the SA information is initial SA information, and the method further comprises: storing state associated with the subscriber, the stored state including the geographic region of interest; subsequent to storing the subscriber state, identifying a plurality of new navigation hazards; identifying new navigation hazards of interest, the new navigation hazards of interest associated with the geographic region of interest; generating updated SA information based upon the geographic region of interest and the new navigation hazards of interest; and sending the updated SA information to the subscriber. In one aspect, the method further comprises assigning a threat level to at least one of the navigation hazards and determining a threat level of interest associated with the subscriber, wherein identifying the navigation hazards of interest is further based upon the threat level of interest.

In another aspect, a computer readable storage medium is provided. The computer readable storage medium contains processor readable non-transitory instructions for enabling at least one processor to perform one or more of the methods described herein.

BRIEF DESCRIPTION OF THE DRAWINGS

Various embodiments of the invention may be more fully understood from the following detailed description of the drawings, in which.

DETAILED DESCRIPTION

Before describing embodiments of the present invention, some introductory concepts and terminology are explained. As used herein, the terms "transportation platform" and "platform" are used to describe any type of vehicle used for transport. The terms "cooperating transportation platform" or "cooperating vessel" herein refer to a platform/vessel which shares its local observation data with other platforms/vessels. The term "data record" means any logical grouping of electronic data, including a block of data, a data file, and a data stream. As used herein, a "subscriber" refers to any person, organization, or system (e.g. a command and control system) that requests and/or receives situational awareness (SA) information. The terms "position," "geo-location," and "location" refer to a geographic position, and may be specified as: latitude and longitude; latitude, longitude, and altitude; or any other suitable coordinates. As used herein, the term self-reporting systems refers to systems whereby a vehicle transmits information about itself, such as by radio broadcast. Non-limiting examples of self-reporting systems include Automatic Identification System (AIS) broadcast data and Automatic Dependent Surveillance-Broadcast (ADS-B).

Embodiments of the invention will be described herein by way of examples directed towards specific application domains, such as maritime transportation. It should be understood that such examples are provided merely to aid understanding of the embodiments and that the invention is not limited to any particular application domain. By way of non-limiting example, the SA information provided by the present systems and methods may be of interest to: ships, including large cargo ships, super yachts, and recreational boats; oil platforms; transport trucks, including ice road trucks; trains; aircraft, both military and civilian; logistics managers (such as for fleet monitor); first responders; environmental organizations; and various federal, state, and local government agencies.

Figure 1:
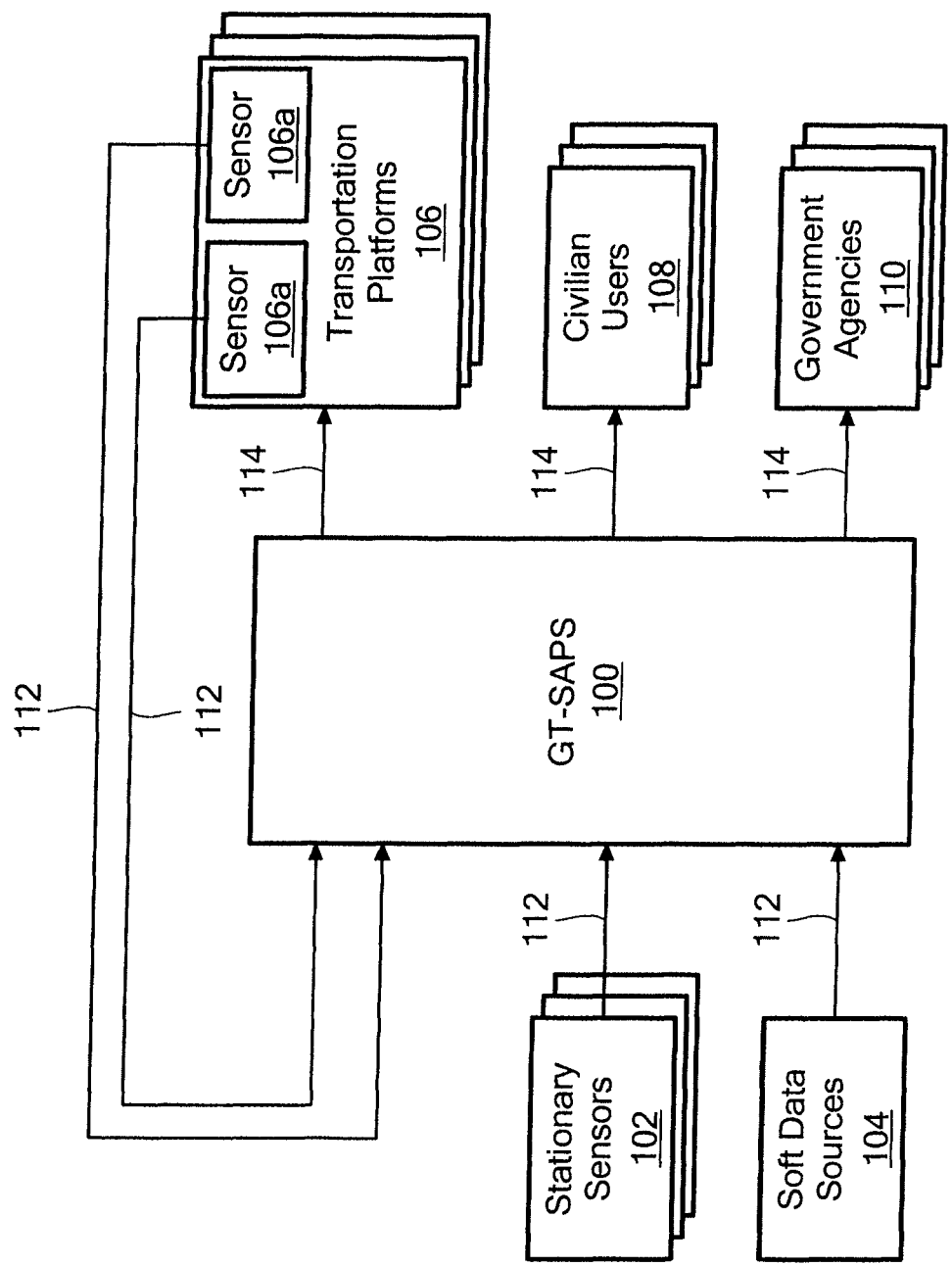
FIG. 1 is a network diagram which includes an illustrative situational awareness personal service (SAPS)

Referring to FIG. 1, a Situational Awareness Personal Service (SAPS) 100 is shown. The operation of the SAPS 100 will be discussed in detail below in conjunction with FIGS. 2 and 3. Suffice it to say here, the SAPS 100 generally receives data records from a plurality of data sources, correlates and analyzes the data records, generates high-level, tailored SA information based upon the analyzed data, and provides the SA information to a plurality of subscribers.

The data sources include stationary sensors 102, soft data sources 104, transportation platform sensors 106a, or any other relevant sources. Each of the data sources 102, 104, 106a is coupled to the SAPS 100 via a communication path 112 from the data source to the SAPS 112. The communication paths 112 can include unidirectional communication paths and/or bidirectional paths, such as radio broadcasts, other RF communications, satellite links, and computer networks. Each communication path 112 may represent a plurality of physical and/or logical communication links which are interconnected via relays, switches, routers, and the like.

In one embodiment for use hi the maritime transportation domain, the communication paths 112 include AIS broadcasts that are transmitted from a transportation platform (e.g., vessel) 106 and received by an AIS receiver (not shown). The AIS receiver may be land-based, such as a Vessel Traffic Service (VTS) receiver, or satellite-based. As is known in the art, AIS broadcasts can be received by certain satellites and relayed back to Earth. The land/satellite-based AIS receiver can, in turn, make the AIS broadcast data available via the Internet and accessible to the SAPS 100, thus providing a path from the ship to the SAPS 100.

Each of the transportation platform sensors 106a may be associated with a corresponding one of a plurality of transportation platforms 106 (each platform has an arbitrary number of sensors) and provides local observation data to the SAPS 100. The stationary sensors 102 generally have a fixed position relative to the transportation platforms 106 and, for example, may be fixed upon land, a buoy, or a satellite. The stationary sensors 102 and transportation platforms sensors 106a may include: radio receivers, GPS, radar, sonar, ocean-bottom seismometers (OBS), radio-frequency (RF) receivers, lasers, light radars (LIDARs), thermal imaging devices, other types of cameras, icing sensors, wind speed sensors, wind direction sensors, precipitation sensors, lightning sensors, air traffic control data, and any other relevant type of sensor. The soft data sources 104 may include: environmental reports, such as weather reports and meteorological aerodrome (META) reports; satellite mapping services; marginal ice reports; reports from the National Oceanic and Atmospheric Administration (NOAA); geographical information systems (GIS) data, etc. In addition, the SAPS can receive reports manually generated by crew onboard a transportation platform, such as reports of local hazards.

In another embodiment for use in the maritime domain, two or more of the transportation platforms (i.e. vessels) 106 can share radar track data via AIS broadcasts using techniques described in PCT Publication No. WO 2013059916 ("Systems and methods for extending maritime domain awareness by sharing radar tracks between vessels"), which is incorporated herein by reference. One commercial embodiment of those techniques is TracShare®. As is known in the art, TracShare® allows a vessel 106 to receive remote radar track data from neighboring, cooperative vessels and combine the remote radar track data with local radar track data to extend the vessel's domain awareness. The vessel 106 may also broadcast/relay its local radar data along with the remote radar data and a "social network" may result. It should now be appreciated that a communications path 112 may represent an AIS broadcast transmitted by a first transportation platform and received by a second transportation platform, then relayed by the second transportation to ground-based AIS receiver. Further, such a communication path 112 may carry radar track data in addition to standard AIS broadcast information.

The SAPS 100 subscribers may include transportation platforms 106, civilian users 108, government agencies 110, and any other persons or organizations that benefit from SA information. Each of the subscribers 106-110 may be coupled to the SAPS 100 using any suitable bi-directional communication path 114, such as the Internet. As shown, a transportation platform 106 can act as both a data source and a subscriber to the SAPS 100 and thus, a pair of communication paths 112, 114 may represent a single bi-directional communication path. Some transportation platforms 106 may act as only a data source or as only a subscriber to the SAPS 100.

In one embodiment, the SAPS 100 is a centralized service which is accessible by a large number of subscribers 106-110 via the Internet. This arrangement makes it possible to deliver tailored, personal SA information inexpensively to subscribers around the globe. Further, the SAPS 100 can provide SA information in widely accessible data formats (discussed further below in conjunction with FIG. 3) and therefore can be accessed with commercial off-the-shelf (COTS) computing devices, such as personal computers, tablet computers, and smartphones. It will be appreciated that many existing SA solutions require the use of expensive and/or dedicated hardware.

In another embodiment, the SAPS 100 may be installed onboard a transportation platform 106 and accessible only to that platform and/or neighboring platforms. Here, the communication paths 112 may be comprised of a local-area network (LAN) connection and/or a computer bus (e.g. USB).

Figure 2:
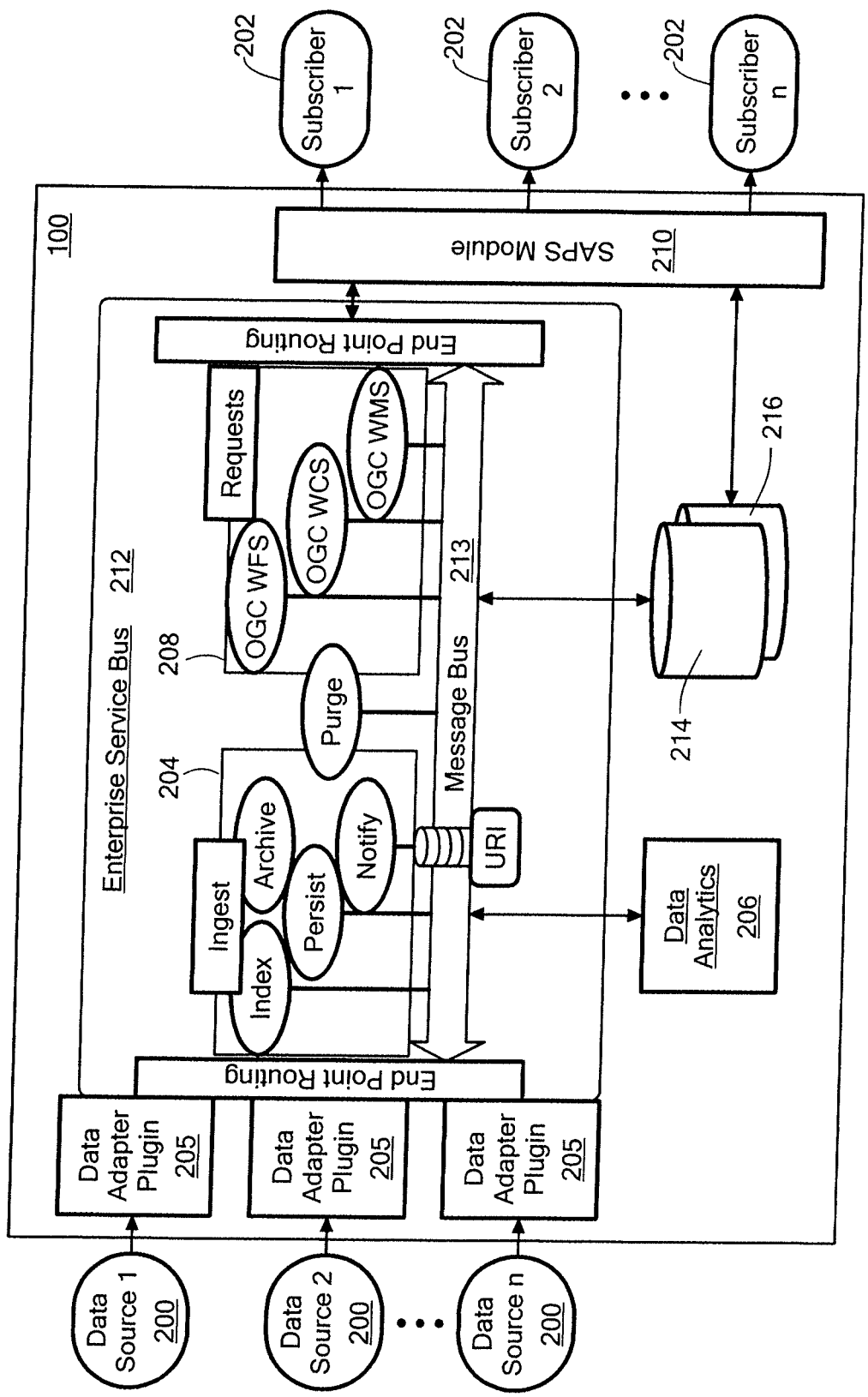
FIG. 2 is a block diagram of the SAPS of FIG. 1.

Referring now to FIG. 2, wherein like reference numerals identify similar or identical elements as in FIG. 1, a SAPS 100 generally receives data records from a plurality of data sources 200 and provides tailored, personalized SA information to a plurality of subscribers 202. The data sources 200 may include stationary sensors 102, soft data sources 104, and transportation platform sensors 106a, as shown in FIG. 1. The subscribers 202 may include transportation platforms 106, civilian users 108, and government agencies 110, also shown in Ha 1.

In one embodiment, the SAPS 100 may utilize a service-oriented architecture (SOA) wherein various services are coupled together via an enterprise services bus 212. The services may be logically and/or physically grouped into modules, such as a data ingestion module 204, a data analytics module 206, a visualization module 208, and a situational awareness personal service (SAPS) module 210, each of which will be described further below. The modules 204-210 may correspond to one or more software application processes running within one or more physical and/or virtual computing systems. In one embodiment, shown in FIG. 2, the module 204-210 are coupled via a message bus 213, which may include a local computer bus, a local-area network (LAN), a wide-area network (WAN), and/or a wireless computer network. It will be appreciated that other software architectures, frameworks, and network topologies can be employed within the SAPS 100.

The data ingestion module 204 receives data records from a wide variety of data sources 200 and provides compatible data records to the other modules 206-210. As discussed above in conjunction with FIG. 1, the data sources 200 may provide a variety of different types of data, for example: textual-based information, such as meteorological aerodrome report (METAR) data; vector-based information, such as gridded binary (DRIB) data format; raster-based information, such as satellite or radar data; and/or weather related information, such as standard hydrologic exchange format (SHEF), terminal aerodrome forecasts (TAF), and aeronautical data format (ADF). Likewise, the sensors 102 and 106 may provide: raster data, such as satellite, radar, or sonar data; and domain-specific broadcast data, such as "Aid-to-Navigation" broadcasts and Automatic Identification System (AIS) broadcasts. Because the data records may be in a variety of different formats, it may be necessary to convert some data records to a compatible format before the records can be aggregated, correlated, and/or analyzed. Thus, in embodiments, the data ingestion module 204 converts received data records having a first format into a different second format compatible with the other modules 206-210.

In one particular embodiment, the data ingestion module 204 may utilize a plurality of data adapter plug-ins 205 to convert data records to a format compatible with the SAPS 100 using techniques described in U.S. Pat. No. 7,084,052 ("System and Method for integration of Data Records Having Differing Data Types to a Geographical information System"), which is incorporated herein by reference, in particular, the module 204 may (1) determine the source data format corresponding to the data source, (2) select a suitable plugin based on the source data format, and (3) invoke the plug-in to convert the data to a compatible format.

In some embodiments, the data ingestion module 204 stores the converted data records to a data store 214, which may be a relation database, a high performance file store, or any other suitable data store. The other modules 206-210, such as the data analytics module 206, may be configured to read compatible data records from the data store 214.

In one embodiment, the data ingestion module 204, data analytics module 206, and/or visualization framework 208 are provided by Raytheon's uFrame™ architecture. As is known in the art, uFrame™ is a universal system architecture for performing environmental data analysis. The uFrame™ system can be used with the SAPS 100 because it provides plug-and-play compatible with a variety of standard data formats, is optimized for high-performance data services using advanced data serialization techniques to enable gaming-style operator interactions with dynamic data updates, and provides visualization which is customizable at the base/site/user level through XML files and scripts that can give users a completely tailored view of the data and concept of operations. Further, uFrame™ is plug-in extendable and therefore applications and services can readily utilize and extend uFrame™ various data services. In addition, the data analytics module 206, and/or visualization module 20 may utilize Raytheon's Arctic Monitoring and Prediction (RAMP) software, which is capable of predicting icebergs and other navigation hazards, to provide enhanced SA information to maritime vessels. Both uFrame™ and RAMP are described further in *Raytheon Technology Today*, 2011 issue 2, pages 32-34, which is incorporated herein by reference.

The data analytics module 206 generally receives a plurality of compatible data records from the data ingestion module 204, either directly or indirectly (via the data store 214) and generates high-level, tailored SA information by aggregating, correlating, and analyzing the received data records. The data analytics module 206 is capable of sifting through vast amounts of data, capturing complex relations between the data, and recognizing patterns, events, and anomalies within the data in order to generate SA information. Such SA information includes recommended courses of action and threat assessments. In embodiments, the aggregated/correlated data records and/or the generated SA information can be cached (i.e. stored) within the data store 214 to minimize future processing efforts.

In one embodiment, the data analytics module 206 comprises Larus Technologies' Total::Insight™ High Level information Fusion Engine (HLIFE). As is known in the art, HLIFE uses computational intelligence, advanced learning techniques, and prediction capabilities to provide decision support and threat analysis using a variety of data sources. HLIFE's capabilities include: anomaly detection; trajectory prediction; intent/threat assessment; and course of action recommendations, such as optimal transportation platform routing. Further, HLIFE can be integrated into the uFrame™ architecture as a plug-in service and configured to receive data records from uFrame™. Thus, it should now be appreciated that the data ingestion module 204, data analytics module 206, visualization module 208, and enterprise bus 212 can be enabled by combining uFrame™, RAMP, and HLIFE.

The visualization module 208 may utilize Open Geospatial Consortium (OGC) services, such as web map (WMS), web feature (WFS) and web coverage (WCS) services. As is known in the art, these OGC services provide geospatial registration of data and impacts and are compatible with OGC-compliant web visualization clients. Thus, in some embodiments, a subscriber 202 includes an OGC-compliant visualization client that can make subscription requests and interact with the OGC visualization services provided by the visualization module 208. In such embodiments, the data ingestion module 200 may register ingested data and associated data type with the OGC services. Further, the data analytics module 206 may register the results of its SA analysis (generally in the form of impacts) with the OGC services to allow ready access by a subscriber's OGC-compliant visualization client. As is further known in the art, Raytheon's uFrame™ architecture and RAMP software provide support for various OGC services and clients; uFrame™ and/or RAMP may also be used by a subscriber 202, in addition to the DBR 100.

The SAPS module 210 may be coupled to the data analytics module 206 via the enterprise bus 212. In embodiments wherein the SAPS 100 utilizes uFrame™, the SAPS module 210 can be provided as a plug-in, such as a plugin to uFrame™ Visualization Framework, which can be included within the visualization module 208. In operation, the SAPS module 206 generally receives SA information requests from the plurality of subscribers 202 and responds with tailored SA information generated using the data analytics module 206; more detailed operation is discussed further below in conjunction with FIG. 3.

In embodiments, the SAPS module 210 further includes a data store 216 to store information relating to a subscriber 202, herein referred to as "subscriber state." In one example, a subscriber 202 is associated with a transportation platform and the SAPS module 210 stores the platform's last known location, speed, and heading so that it may provide updates when new hazards are detected along the platform's stated/projected course. It should be appreciated that data store 216 may be logically or physical the same as data store 214.

Figure 3:
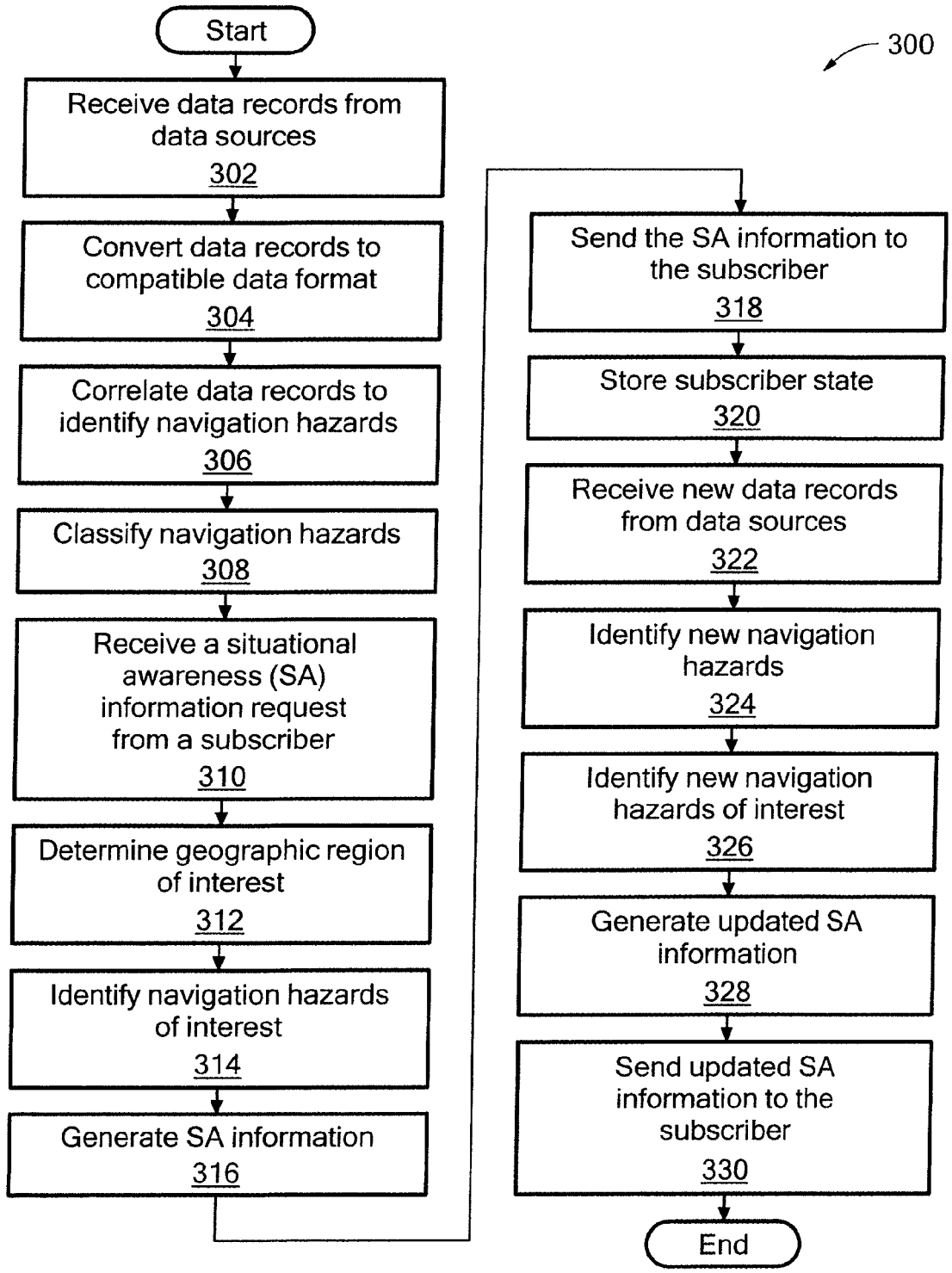
FIG. 3 is a flowchart showing an exemplary method for providing situational awareness information.

Referring now to FIG. 3, an exemplary sequence of steps 300 for providing real-time, tailored SA information, is shown. It should be appreciated that FIG. 3 shows processing steps that can be performed within the SAPS 100 (FIG. 2), with each step 302-330 being implemented within one or more of the modules 204-210. For simplicity of explanation, the steps below will be described as being performed by the SAPS 100 and not individual modules therein.

In step 302, the SAPS 100 receives one or more data records from a variety of data sources, such as data sources 200 (FIG. 2). As any of the sources may provide data records in an incompatible format, in step 304, the SAPS 100 may convert one or more of the received data records into a compatible format, using the techniques discussed above in conjunction with FIG. 2.

In step 306, the SAPS 100 aggregates and correlates the data records using geo-spatial and temporal correlation techniques, which are known in the art. Based upon the correlated data, the SAPS 100 identifies navigation hazards, including: manmade hazards, such as transportation platforms, ghost ships, pirate vehicles, other vehicles, oil drums, and lost containers; and environmental hazards including floating debris, logs, ice, and oil spills. In embodiments, the SAPS, in step 308, can classify the identified navigation hazards along several dimensions. For example, hazards may be classified by type (e.g. "iceberg", "oil spill", "weather", "enemy vehicle", "friendly vehicle"), relative threat to a subscriber (e.g. "low", "normal", "high"), and/or time ("immediate", "distant").

Several techniques for identifying and/or classifying navigation hazards are known to those in the art. For example, multiple data records representing radar plots can correlated to track moving objects (sometimes referred to as "targets") using known multiradar tracking techniques. As another example, the SAPS 100 may utilize HLIFE (described above in conjunction with FIG. 2) which is capable of detecting anomalies and/or predicting hazardous object trajectories. In some embodiments, the aggregated/correlated data records and/or identified navigation hazards may be stored in the data store 214 (FIG. 2).

In step 310, the SAPS 100 receives a SA information request from a subscriber 202 (FIG. 2). The request may include one or more parameters used to process the request, such as information about the subscriber and/or the desired SA information. For example, the request parameters may specify a geographic region of interest to the subscriber, the classes of hazards/threats the subscriber is concerned with, the desired format of the corresponding SA information response, or any other subscriber preferences. Specific request parameters are discussed further below in conjunction with steps 312, 314, and 316.

In embodiments, the subscriber is associated with a transportation platform and data records associated with the transportation platform's sensors 106a (FIG. 1) can be included within the SA information request. Thus, the SA information request can further serve as a data source 200 (FIG. 2). Alternatively, the SAPS 100 can receive data records from the transportation platform's sensors 106a independent from the SA information request.

In step 312, the SAPS 100 determines a geographic region of interest (also referred to herein as a "region of interest") associated with the SA information request. In one embodiment, the region of interest is defined as an area surrounding a given geographic location, such as the area surrounding the subscriber's current location or any other location of interest. In another embodiment, the region of interest is defined in terms of a transportation platform's course, such as an origin/current location and a destination.

The region of interest can be directly defined as a plurality of SA information request parameters, for example as a circular area specified by a center geo-location and a radius, a bounding box specified by two or more corner locations, an origin/current location and a destination location, or the name of a geographic region (e.g. "The Northwest Passage").

Alternatively, the region of interest may be defined indirectly. In one example, the subscriber is associated with a transportation platform and the request parameters may include a unique transportation platform identifier. This identifier may be associated with a standard broadcast information service, such as an AIS identifier used by ships or an ADS-B identifier used by aircraft. As discussed above in conjunction with FIG. 1, such broadcasts can be received by land-based and/or satellite-based receivers and made available to the SAPS 100. Thus, the SAPS 100 can indirectly determine the transportation platform's position and/or course (and thus region of interest) using the transportation platform identifier.

In step 314, the SAPS 100 determines navigation hazards that are of interest to the subscriber. The hazards of interest will generally be associated with the geographic region of interest determined in step 312 and a specific transportation platform associated with the subscriber request. These may be selected according to several criteria, including various preferences and characteristics of the subscriber.

In one embodiment, the SA information request may specify one or more relevant classes of navigation hazards corresponding to classes assigned to the hazards identified in conjunction with step 308. For example, the request may indicate that the subscriber is interested in only environmental hazards, or pirate vehicles. Alternatively, the SAPS may infer the relevant classes based upon known characteristics of the subscriber. For example, where the subscriber is associated with an oil tanker, the SAPS 100 may infer that the subscriber is particularly interested in the threat of pirates.

Next, the SAPS 100 generates high-level SA information in step 316 that is tailored to the subscriber. As discussed above, the scope and type of the SA information are generally based upon on the SA information request parameters and/or characteristics of the subscriber.

In one embodiment, the generated SA information includes a recommended course of action. The course of action may be an optimal route from an origin to a destination and may be based upon the identified navigation hazards. The origin and/or destination can be associated may be based upon the geographic region of interest as determined in step 312. Any suitable routing mechanism may be used and the route may be tailored based upon capabilities of the subscribing transportation platform. For example, ships with ice breaking capability can be routed through ice-covered waters, whereas other types of ships should be routed around such waters. Once an optimal route is selected, it may be desirable to filter the hazards of interest selected in step 314 so as to exclude hazards not along the route. Thus, it should be appreciated that step 314 may be repeated after step 316 is performed and that these steps can be performed iteratively in order to determine the optical route and most relevant hazards.

In embodiments, the generated SA information includes an enhanced situational display. The enhanced situational display may include information on cooperative transportation platforms, non-cooperative transportation platforms, and any other identified navigation hazards. The enhanced display may encompass the entire geographic region of interest, or only a portion of that region, such as a region surrounding the subscriber's current location. In one embodiment, the SAPS 100 may maintain a track history for transportation platforms (such as in the data store 216) and the enhanced situational display may include the track of one or more transportation platforms. The generated SA information may further include a threat assessment provided in any suitable graphical or textual format (e.g. "high," "medium," or "low").

In one embodiment, the SAPS 100 can determine the subscriber's global position and this position is included in the generated SA information. In one embodiment, the SAPS 100 uses a technique similar to those used by LOng RAnge Navigation (LORAN) systems. Herein, the SAPS 100 determines the subscriber's global position based upon the global position of another object and the relative position of the subscriber to the other object.

The generated SA information may be provided in various forms, and the format can be specified as a request parameter or inferred by the SAPS 100 using characteristics of the subscriber. In one embodiment, the subscriber uses a smartphone, tablet computer, or other web-enabled computer and the SA information is returned as a web page comprised of text and/or images (raster and/or vector based). In another embodiment, the subscriber is associated with a maritime vessel and the SA information includes a plurality of Electronic Chart Display and Information System (ECDIS) overlays, such as a first overlay showing the hazards of interest and a second overlay showing the course of action. In another embodiment, the SA information is provided via a text-based API and the subscriber is associated with a computer application that interacts with the text-based API. In yet another embodiment, the SA information is provided as plain text.

In step 318, the SAPS 100 sends the tailored SA information to the subscriber. In embodiments, the SAPS 100 may also store the SA information in the data store 26 and/or register it with provided OGC services. In some embodiments, this is the final step in the interaction between the subscriber 202 and the SAPS 100. In other embodiments, the SAPS 100 stores the subscriber's state in step 320 and subsequently uses the state to provide real-time SA updates to the subscriber 202. The subscriber state includes any information needed to generate SA updates specified to the subscriber 202, such as: any relevant characteristics of the subscriber and associated transportation platform; the classes of hazards the subscriber is concerned with; the subscriber's last known position, heading, and speed; the unique platform identifier associated with the subscriber; and the geographic region of interest.

The SAPS 100 can provide updated SA information to the subscriber 202 based on various criteria, for example based upon a triggering event, periodically, and/or on-demand (i.e. as the subscriber requests an update). In one embodiment, shown in FIG. 3, the update process begins at step 322 wherein the SAPS 100 receives new data records from a data source. In step 324, new navigation hazards are identified in based upon the new data records. In step 326, the SAPS 100 can next identify new navigation hazards of interest to the subscriber based upon the subscriber's stored state and the new navigation hazards. In step 328, updated SA information can be generated using the techniques described above in conjunction with step 316. The updated SA information may include: a course of action change, an updated enhanced situational display, and/or an updated threat assessment. In step 330, the updated SA information is stored and sent to the subscriber. In some embodiments, the SA information may also be stored in the data store 216 and/or registered with provided OGC services. In embodiments, the SAPS 100 provides SA updates to multiple subscribers, and thus steps 326, 328, and 330 may be repeated for all subscribers that are impacted by the newly identified navigation hazards.

It should be appreciated that various other features can be added to the method 300. For example, before providing SA information to a subscriber, the SAPS 100 can perform authentication and/or authorization steps, such as restricting certain information to authorized government agencies. The SAPS 100 may also take steps to prevent data spoofing whereby a transportation platform and/or subscriber could provide false information to the SAPS 100 and thereby mislead other subscribers. Further, a fee-for-service payment model may be used wherein the SAPS 100 verifies that a subscriber has paid a required fee before providing it SA information. Additionally, the SAPS 100 could implement a quid pro quo information exchange whereby subscribers must provide local observation (Le, data records) before they receive tailored, personal SA information.

The rectangular elements in FIG. 3 (typified by element 302), herein denoted "processing blocks," represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Figure 4:
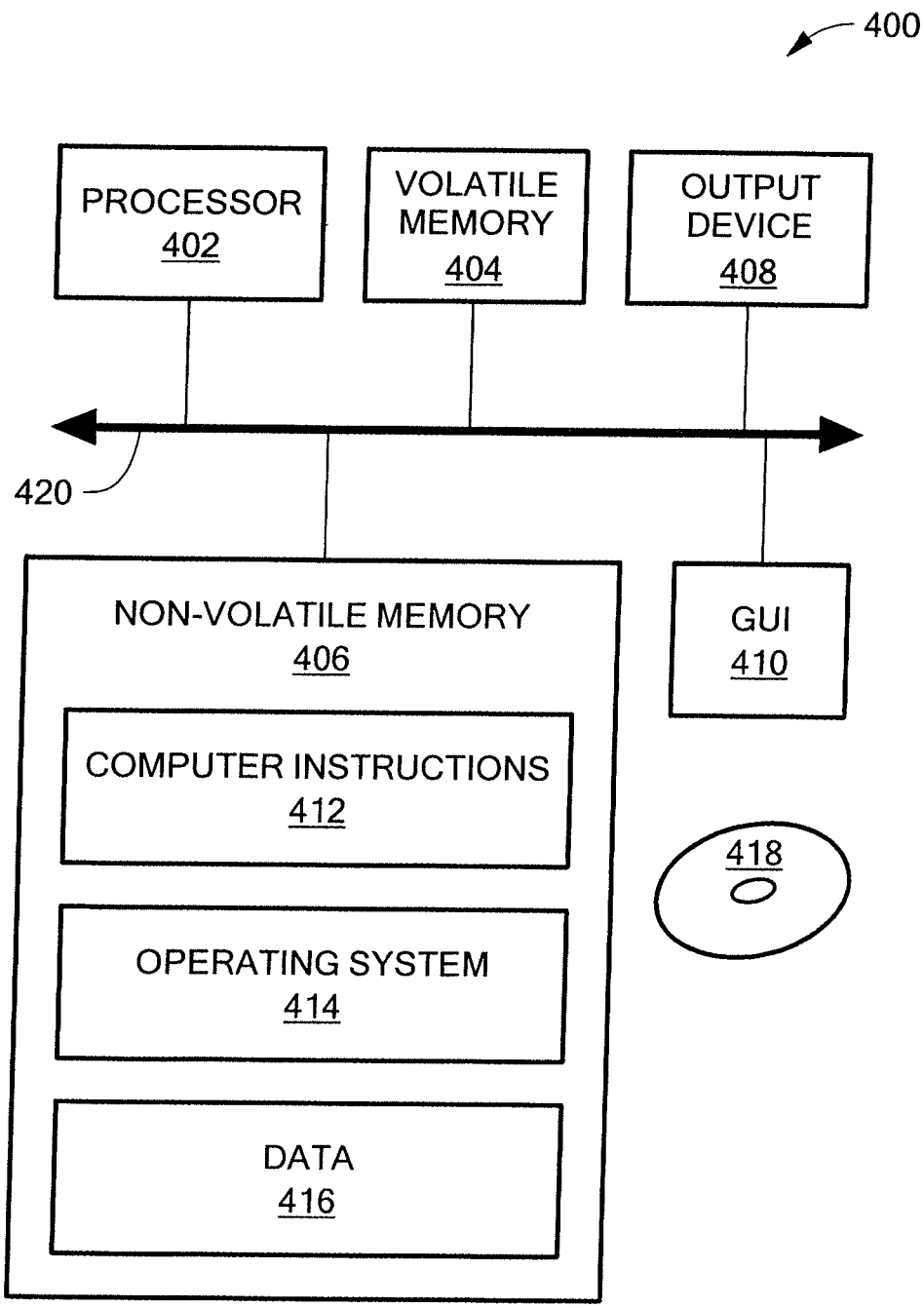
FIG. 4 is a block diagram showing an illustrative computer system for use with the SAPS of FIG. 2.

FIG. 4 shows an exemplary computer 400 that can perform at least part of the processing described herein. The computer 400 includes a processor 402, a volatile memory 404, a non-volatile memory 406 (e.g., hard disk), an output device 408, and a graphical user interface (GUI) 410 (e.g., a mouse, a keyboard, a display, for example). The non-volatile memory 406 stores computer instructions 412, an operating system 414, and data 416, each of which is coupled together by a bus 420. In one example, the computer instructions 412 are executed by the processor 402 out of volatile memory 404. In one embodiment, an article 418 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or ASIC (application-specific integrated circuit)).

Having described exemplary embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims. All references cited herein are hereby incorporated herein by reference in their entirety.

What is claimed is:

1. A system, comprising:
a data ingestion module to receive first radar data observed at a first transportation platform and to receive second radar data from observed at a second transportation platform, wherein the first and second radar data are received from Automatic Identification System (AIS) broadcasts, and to receive environmental data;
a data analytics module, coupled to the data ingestion module, to
correlate the first and second radar data with the environmental data to identify a plurality of navigation hazards,
identify at least one of the navigation hazards as a navigation hazard of interest, the navigation hazard of interest associated with a geographic region of interest, and
generate situational awareness (SA) information based upon the geographic region of interest and the navigation hazard of interest; and
a situational awareness personal service (SAPS) module coupled to the data analytics module, comprising a processor, to
receive an SA information request from a subscriber,
determine the geographic region of interest, the geographic region of interest associated with the SA information request, and
send the SA information to the subscriber.

2. The system of claim 1 wherein the first radar data is relayed from the first transportation platform to the second transportation platform as an AIS broadcast.

3. The system of claim 1 wherein at least one of the navigation hazards is identified by a position, a heading, and a speed.

4. The system of claim 1 wherein the SA information includes an enhanced situation display of the geographic region of interest.

5. The system of claim 1 wherein the subscriber is associated with a transportation platform and the geographic region of interest is based upon the transportation platform's last known position and heading.

6. The computer system of claim 5 wherein the SA information includes a course of action.

7. The system of claim 1 wherein the environmental data comprises meteorological aerodrome report (METAR) data, gridded binary (GRIB) data, standard hydrologic exchange (SHEF) data, terminal aerodrome forecasts (TAF) data, or aeronautical data format (ADF) data.

8. A computer-implemented method, comprising:
receiving first radar data observed at a first transportation platform;
receiving second radar data observed at a second transportation platform, wherein the first and second radar data are received from Automatic Identification System (AIS) broadcasts;
receiving environmental data;
correlating the first and second radar data with the environmental data to identify a plurality of navigation hazards;
receiving a situational awareness (SA) information request from a subscriber,
determining a geographic region of interest associated with the SA information request;
identifying at least one of the navigation hazards as a navigation hazard of interest, the navigation hazard of interest associated with the geographic region of interest;
generating SA information based upon the geographic region of interest and the navigation hazard of interest; and
sending the SA information to the subscriber,
wherein the method is implemented in a computer system comprising one or more processors configured to execute one or more computer programs.

9. The method of claim 8 wherein the first radar data is relayed from the first transportation platform to the second transportation platform as an AIS broadcast.

10. The method of claim 8 wherein at least one of the navigation hazards is identified by a position, a heading, and a speed.

11. The method of claim 8 wherein the SA information includes an enhanced situation display of the geographic region of interest.

12. The method of claim 8 wherein the subscriber is associated with a transportation platform and the geographic region of interest is based upon the transportation platform's last known position and heading.

13. The method of claim 12 wherein the SA information includes a course of action.

14. The method of claim 8 wherein
receiving environmental data comprises receiving meteorological aerodrome report (METAR) data, gridded binary (GRIB) data, standard hydrologic exchange (SHEF) data, terminal aerodrome forecasts (TAF) data, or aeronautical data format (ADF) data.

15. The method of claim 8, wherein the navigation hazards are initial navigation hazards, the navigation hazard of interest is an initial navigation hazard of interest, and the SA information is initial SA information, further comprising:
storing state associated with the subscriber, the stored state including the geographic region of interest;
subsequent to storing the subscriber state, identifying a plurality of new navigation hazards;
identifying at least one of the plurality of new navigation hazards as a new navigation hazard of interest, the new navigation hazard of interest associated with the geographic region of interest;
generating updated SA information based upon the geographic region of interest and the new navigation hazard of interest; and
sending the updated SA information to the subscriber.

16. The method of claim 8, wherein the SA information is stored and registered.

17. The method of claim 8 further comprising:
assigning a threat level to at least one of the navigation hazards; and
determining a threat level of interest associated with the subscriber,
wherein identifying the navigation hazard of interest is based upon the threat level of interest.

* * * * *